US012693645B2

(12) United States Patent　　　　(10) Patent No.:　US 12,693,645 B2
　　Koguma et al.　　　　　　　　　　(45) Date of Patent:　　　Jul. 28, 2026

(54) OPERATION ASSISTANCE DEVICE AND PROGRAM FOR CALCULATING CONSTRAINT CONDITIONS IMPOSED ON AN ENERGY SUPPLY FACILITY

(71) Applicant: IHI CORPORATION, Tokyo (JP)

(72) Inventors: Yuji Koguma, Tokyo (JP); Kenichi Hamaguchi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 560 days.

(21) Appl. No.: 18/015,580

(22) PCT Filed: Jul. 7, 2021

(86) PCT No.: PCT/JP2021/025665
§ 371 (c)(1),
(2) Date: Jan. 11, 2023

(87) PCT Pub. No.: WO2022/014448
PCT Pub. Date: Jan. 20, 2022

(65) Prior Publication Data
US 2023/0251615 A1　　Aug. 10, 2023

(30) Foreign Application Priority Data

Jul. 13, 2020　　(JP) ................................. 2020-119889

(51) Int. Cl.
　G05B 19/042　　　(2006.01)
　H02J 13/10　　　(2026.01)
(52) U.S. Cl.
　CPC ............ G05B 19/042 (2013.01); H02J 13/10 (2026.01); G05B 2219/2639 (2013.01)

(58) Field of Classification Search
　CPC .......... G05B 19/042; G05B 2219/2639; G05B 15/02; H02J 13/00001; H02J 2300/24;
(Continued)

(56) References Cited

U.S. PATENT DOCUMENTS

2016/0103432 A1 *　4/2016　Lyu ........................ G05B 15/02
　　　　　　　　　　　　　　　　　　700/275
2016/0313716 A1 *　10/2016　Chen ........................ H02J 4/00
(Continued)

FOREIGN PATENT DOCUMENTS

JP　　　　5179423 B2　　4/2013
JP　　2017-156963 A　　9/2017
(Continued)

OTHER PUBLICATIONS

YouTube video by username Richlands Clan, "Tesla PowerWall, Solar Panels, and App," published May 28, 2019, downloaded from https://www.youtube.com/watch?v=M09JAdInQBY (Year: 2019).*
(Continued)

*Primary Examiner* — Eric J Yoon

(57)　　　　　　ABSTRACT
An operation assistance device includes a calculation unit that calculates at least one constraint condition imposed on each of a plurality of energy supply facilities in order to satisfy a predetermined constraint condition based on matters caused by an energy demand facility and/or matters caused by the energy supply facilities and an output unit that displays an operable range that can satisfy the predetermined constraint condition and an inoperable region that is not capable of satisfying the predetermined constraint condition on the basis of the at least one constraint condition and also displays information indicating a current operating state of the plurality of energy supply facilities and an assumed operating state different from the current operating state.

8 Claims, 12 Drawing Sheets

(58) Field of Classification Search
CPC ...... H02J 3/14; H02J 3/32; H02J 3/381; H02J 3/00; H02J 13/00; H02J 13/00004; H02J 3/004; G06Q 50/06; Y04S 10/50; Y04S 10/123; Y04S 20/221
See application file for complete search history.

(56)                References Cited

U.S. PATENT DOCUMENTS

| | | | |
|---|---|---|---|
| 2019/0081479 A1* | 3/2019 | Faley ................ | H02J 13/00001 |
| 2020/0387847 A1 | 12/2020 | Kawamura et al. | |
| 2022/0179381 A1* | 6/2022 | Carrasco Schmidt ...................... | G05B 19/042 |

FOREIGN PATENT DOCUMENTS

| | | |
|---|---|---|
| WO | 2014/129470 A1 | 8/2014 |
| WO | 2019/159477 A1 | 8/2019 |

OTHER PUBLICATIONS

A. Sashirekha et al., "Combined heat and power (CHP) economic dispatch solved using Lagrangian relaxation with surrogate subgradient multiplier updates," Electrical Power and Energy Systems, published Sep. 26, 2012 (Year: 2012).*
G. Tyagi et al., "Combined heat and power dispatch using Particle swarm optimization," IEEE, published 2012 (Year: 2012).*
Tohru Yamaguchi et al., "IM400-FLECS (Flexible Electric Cogeneration System)", Ishikawajima-Harima Engineering Review, vol. 36, No. 5, pp. 377-379, 1996.

* cited by examiner (a)

(b)

(a)

(b)

(a)

(b)

OPERATION ASSISTANCE DEVICE AND PROGRAM FOR CALCULATING CONSTRAINT CONDITIONS IMPOSED ON AN ENERGY SUPPLY FACILITY

CROSS REFERENCE TO RELATED APPLICATIONS

This patent application is a U.S. national stage application under 35 U.S.C. § 371 of International Patent Application No. PCT/JP2021/025665 filed on Jul. 7, 2021, which claims the benefit of foreign priority to Japanese Patent Application No. JP 2020-119889 filed on Jul. 13, 2020. The International Application was published in Japanese on Jan. 20, 2022, as International Publication No. WO 2022/014448 A1 under PCT Article 21 (2).

TECHNICAL FIELD

The present disclosure relates to an operation assistance device and an operation assistance program.

BACKGROUND ART

In recent years, a system has been examined which supplies energy from a plurality of energy supply facilities to an energy consumer. Patent Literature 1 discloses a technique related to an energy system with high cost competitiveness. The technique disclosed in Patent Literature 1 relates to the facility design of the energy system with high cost competitiveness. The technique disclosed in Patent Literature 1 calculates an operation plan. Patent Literature 2 discloses a technique that distributes energy. According to the technique disclosed in Patent Literature 2, the cost of consuming energy supplied from a plurality of energy supply facilities is optimized.

CITATION LIST

Patent Literature

Patent Literature 1: Japanese Patent No. 5179423
Patent Literature 2: Japanese Unexamined Patent Publication No. 2017-156963

SUMMARY OF INVENTION

Technical Problem

When a system including a plurality of energy supply facilities, such as a microgrid, is operated, the results of optimization calculation disclosed in Patent Literature 1 and Patent Literature 2 are used. However, in a case in which the optimization calculation is used to operate the system, there are elements that are difficult to evaluate numerically. It is difficult to include the elements that are difficult to quantify in the optimization calculation. On the other hand, in some cases, the elements that are difficult to evaluate numerically can be successfully incorporated into the operation of the system depending on the experience and determination of the operator.

The present disclosure describes an operation assistance device and an operation assistance program that enable an operation in which the determination of an operator has been incorporated into a result of calculation.

Solution to Problem

According to an aspect of the present disclosure, there is provided an operation assistance device that assists an operation of an energy supply facility outputting energy to an energy demand facility. The operation assistance device includes a calculation unit that calculates constraint conditions imposed on each energy supply facility on the basis of matters caused by the energy demand facility and mailers caused by the energy supply facility and a display unit that displays the constraint conditions and displays an operating state of the energy supply facility.

Effects of Invention

According to the operation assistance device and the operation assistance program of the present disclosure, it is possible to perform an operation in which the experience of an operator has been incorporated into a result of calculation.

BRIEF DESCRIPTION OF DRAWINGS

FIG. 7(*b*) illustrates another example of the operation map corresponding to the energy supply facility which is the cogeneration system of the fixed heat-to-power ratio type.

FIG. 8(*b*) illustrates an example of an operation map corresponding to an energy supply facility which is a cogeneration system of a constant heat-to-power ratio type which is operatively associated with the operation map of FIG. 8(*a*).

FIG. 10(*b*) illustrates an example of an operation map corresponding to an energy supply facility which is a wind power generation facility.

FIG. 11(*b*) illustrates an example of an operation map corresponding to an energy supply facility which is a cogeneration system of a fixed heat-to-power ratio type.

FIG. 12(*b*) illustrates an example of an operation map corresponding to an energy supply facility which is a cogeneration system of a fixed heat-to-power ratio type.

DESCRIPTION OF EMBODIMENTS

Figure 1:
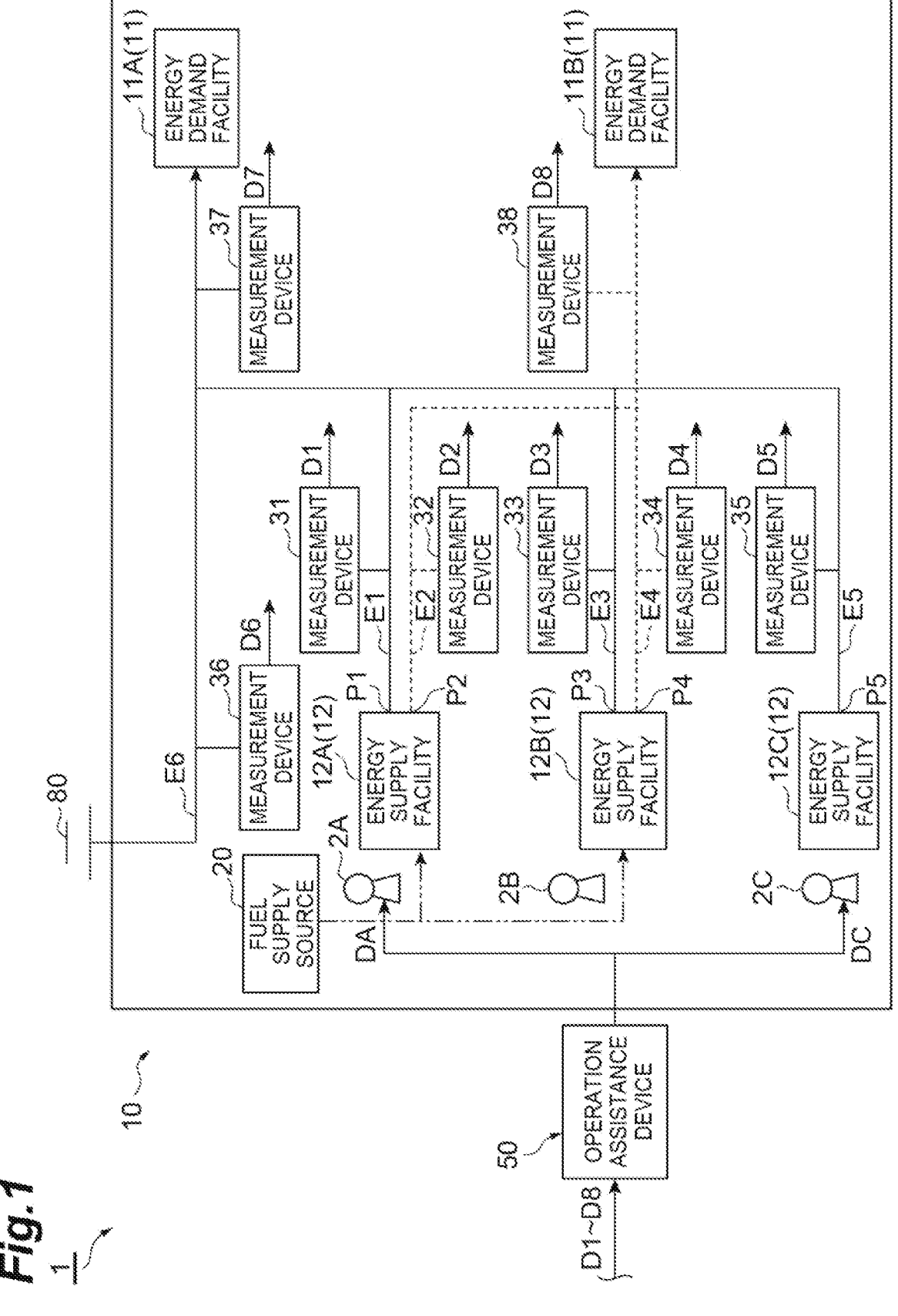
FIG. 1 is a diagram illustrating an energy system to which an operation assistance device according to the present disclosure is applied.

According to an aspect of the present disclosure, there is provided an operation assistance device that assists an operation of an energy supply facility outputting energy to an energy demand facility. The operation assistance device includes a calculation unit that calculates constraint conditions imposed on each energy supply facility on the basis of matters caused by the energy demand facility and matters caused by the energy supply facility and a display unit that displays the constraint conditions and displays an operating state of the energy supply facility.

The operation assistance device can display the constraint conditions and the current operating state to an operator who operates the energy supply facility. The operator refers to information based on the displayed calculation results. The operator adds his or her own determination to the information referred to by the operator. Then, the operator determines the final operating state of the energy, supply facility. Therefore, according to the operation assistance device, it is possible to perform the operation in which the determination of the operator has been incorporated into the results of calculation.

The energy supply facility may output first energy and second energy. The calculation unit may calculate a first energy constraint condition corresponding to the first energy and a second energy constraint condition corresponding to the second energy. The display unit may display the operating state and at least one of a range based on the first energy constraint condition and a range based on the second energy constraint condition in a two-dimensional display region having at least one of the first energy and the second energy as a variable. According to this configuration, the operating state and the constraint conditions are displayed as a two-dimensional map to the operator. As a result, the operator can easily understand the relationship between the operating state and the constraint conditions.

The calculation unit may calculate a change in the operating state over time. This configuration enables the operator to operate the energy supply facility in consideration of the future operating state.

The operating state may include a current operating state of the energy supply facility. The operating state may include an assumed operating state of the energy supply facility different from the current operating state.

A plurality of the energy supply facilities may include a first energy supply facility and a second energy supply facility. The calculation unit may calculate a first facility constraint condition imposed on the first energy supply facility and a second facility constraint condition imposed on the second energy supply facility. The display unit may set a first display region and a second display region different from the first display region. The display unit may display the operating state and the first facility constraint condition of the first energy supply facility in the first display region. The display unit may display the operating state and the second facility constraint condition of the second energy supply facility in the second display region. This configuration makes it possible to perform the operation, into which the determination of the operator has been incorporated, for a plurality of energy supply facilities.

The calculation unit may calculate an assumed constraint condition imposed on the second energy supply facility on the basis of an assumed operating state of the first energy supply facility different from the current operating state and matters caused by the energy demand facility. The display unit may display the first facility constraint condition, the operating state of the first energy supply facility, and the assumed operating state in the first display region. The display unit may display the second facility constraint condition, the operating state of the second energy supply facility, and the assumed constraint condition in the second display region. This configuration makes it possible to determine the operating state of one energy supply facility while considering the influence of the one energy supply facility on the other energy supply facility.

According to another aspect of the present disclosure, there is provided an operation assistance program that assists an operation of an energy supply facility outputting energy to an energy demand facility. The operation assistance program causes a computer to operate as: a calculation unit that calculates constraint conditions imposed on each of a plurality of the energy supply facilities on the basis of matters caused by the energy demand facility and matters caused by the energy supply facility; and an output unit that displays the constraint conditions and an operating state of the energy supply facility. This program makes it possible to perform the operation in which the determination of the operator has been incorporated into the result of the calculation.

Hereinafter, an operation assistance device and an operation assistance program according to the present disclosure will be described below with reference to the drawings. In the description of the drawings, the same elements or corresponding elements are denoted by the same reference numerals, and the redundant description thereof may be omitted, <Energy System>

FIG. 1 is a block diagram illustrating a schematic configuration of an energy system 1 including an operation assistance device 50 according to this embodiment. As illustrated in FIG. 1, the energy system 1 includes a microgrid 10 and the operation assistance device 50. The microgrid 10 has a plurality of energy demand facilities 11A and 11B and a plurality of energy supply facilities 12A, 12B and 12C. The operation assistance device 50 assists the operation of the energy supply facilities 12A, 12B, and 12C in the microgrid 10.

Each of the energy supply facilities 12A, 12B, and 12C of the microgrid 10 outputs energy. The output energy is consumed by the energy demand facilities 11A and 11B. In the microgrid 10, for example, all of the energy demanded by the energy demand facilities 11A and 11B may be covered by the energy supply facilities 12A, 12B, and 12C. The microgrid 10 may be connected to an external energy system 80 as needed. In this case, a portion of the energy demanded by the energy demand facilities 11A and 11B of the microgrid 10 may be covered by the external energy system 80.

All of the energy output from the energy supply facilities 12A, 12B, and 12C of the microgrid 10 may be consumed by the energy demand facilities 11A and 11B. A portion of the energy output from the energy supply facilities 12A, 12B, and 12C may flow out to the external energy system 80. The outflow of the energy to the external energy system 80 is called reverse power flow. In addition, the reverse power flow of the energy from the microgrid 10 to the external energy system 80 affects the balance between the demand and supply of energy in the external energy system 80. It is desirable that the microgrid 10 is managed such that the reverse power flow does not occur.

In a case in which the energy demand facilities 11A and 11B do not need to be distinguished from each other in description, the energy demand facilities 11 and 11B are collectively referred to as "energy demand facilities 11". In a case in which the energy supply facilities 12A, 12B, and 12C do not need to be distinguished from each other in description, the energy supply facilities 12A, 12B, and 12C are collectively referred to as "energy supply facilities 12".

The energy output from the energy supply facility 12 may be, for example, electric energy (for example, power). The energy output from the energy supply facility 12 may be thermal energy (for example, steam). The energy output from the energy supply facility 12 may be hydrogen energy. The energy output from the energy supply facility 12 may be other types of energy. Examples of the energy supply facility 12 that outputs energy include a prime mover (for example, a gas turbine or a gas engine) that can supply power using fuel, a steam boiler that can supply steam using fuel, a storage battery that can be charged with power and can discharge power, and the like. The energy supply facility 12 may be an energy supply facility having one output unit that outputs any one type of energy. The energy supply facility 12 may be a compound energy supply facility. The compound energy supply facility has two output units that output two different types of energy.

A cogeneration system is given as an example of the compound energy supply facility that outputs two types of energy. The cogeneration system can supply power and steam in parallel. The cogeneration system includes, for example, a gas turbine and a steam generator. The gas turbine generates power. The steam generator generates steam using the calories of combustion exhaust gas discharged from the gas turbine. The cogeneration system may be a cogeneration system of a variable heat-to-power ratio type. The cogeneration system of a variable heat-to-power ratio type has a variable output ratio between power and steam. The cogeneration system may be a cogeneration system of a constant heat-to-power ratio type. The cogeneration system of a constant heat-to-power ratio type has a constant output ratio between power and steam.

The energy supply facility 12A according to the present disclosure is a cogeneration system of a variable heat-to-power ratio type. The energy supply facility 12B is a cogeneration system of a constant heat-to-power ratio type. The energy supply facility 12C is a storage battery.

The energy supply facility 12A has an output unit P1 that outputs power E1 and an output unit P2 that outputs steam E2. The energy supply facility 12B has an output unit. P3 that outputs power E3 and an output unit P4 that outputs steam E4. The energy supply facility 12C has an output unit P5 that outputs power E5. The energy supply facilities 12A and 12B are connected to a fuel supply source 20. The energy supply facilities 12A and 12B can output energy (power and/or steam) using fuel supplied from the fuel supply source 20. A solid arrow illustrated in FIG. 1 indicates the flow of power. A dashed arrow indicates the flow of steam. A two-dot chain arrow indicates the flow of fuel.

The electricity demand of the microgrid 10 is covered by the power E1 from the energy supply facility 12A, the power E3 from the energy supply facility 12B, the power E5 from the energy supply facility 12C, and power E6 from the external energy system 80. The steam demand of the microgrid 10 is covered by the steam E2 from the energy supply facility 12A and the steam E4 from the energy supply facility 12B.

An operator 2A is deployed at the energy supply facility 12A. An operator 2B is deployed at the energy supply facility 12B. An operator 2C is deployed at the energy supply facility 12C. The operation assistance device 50 provides each of the operators 2A, 2B, and 2C with an operation map which is operation assistance information which will be described below. The operators 2A, 2B, and 2C manually set the operating states of the energy supply facilities 12A, 12B, and 12C while referring to the operation maps. Therefore, the operation assistance device 50 can control the output of the energy supply facilities 12A, 12B, and 12C through the manual operations of the operators 2A, 2B, and 2C. The energy supply facilities 12A, 12B, and 12C are controllable energy supply facilities. The "operating state" described in the present disclosure means the current operating state of the energy supply facilities 12A, 12B, and 12C. However, the meaning of the "operating state" is not limited to the current operating state of the energy supply facilities 12A, 12B, and 12C. The "operating state" described in the present disclosure includes an assumed operating state in addition to the current operating state. The assumed operating state is a state different from the current operating state.

The energy demand facilities 11A and 11B consume the energy output from the energy supply facilities 12A, 12B, and 12C. The energy demand facilities 11A and 11B are, for example, plants such as factories. The energy demand facility 11A is a plant that consumes power. The energy demand facility 11B is a plant that consumes steam. The energy demand facility 11A is connected to the output unit P1 of the energy supply facility 12A, the output unit P3 of the energy supply facility 12B, and the output unit P5 of the energy supply facility 12C. The energy demand facility 11A consumes the power E1, the power E3, and the power E5 output from the output units P1, P3, and P5, respectively. In addition, the energy demand facility 11A consumes the power E6 output from the external energy system 80. The energy demand facility 11B is connected to the output unit P2 of the energy supply facility 12A and the output unit P4 of the energy supply facility 12B. The energy demand facility 11B consumes the steam E2 output from the output unit P2 and the steam E4 output from the output unit P4.

The microgrid 10 includes a plurality of measurement devices 31, 32, 33, 34, 35, and 36 that can measure energy. The measurement device 31 measures the power E1 output from the output unit P1 of the energy supply facility 12A. The measurement device 31 transmits measurement data D1 indicating the measured power E1 to the operation assistance device 50. The measurement device 32 measures the steam E2 output from the output unit P2 of the energy supply facility 12A. The measurement device 32 transmits measurement data D2 indicating the measured steam E2 to the operation assistance device 50.

The measurement device 33 measures the power E3 output from the output unit P3 of the energy supply facility 12B. The measurement device 33 transmits measurement data D3 indicating the measured power E3 to the operation assistance device 50. The measurement device 34 measures the steam E4 output from the output unit P4 of the energy supply facility 12B. The measurement device 34 transmits measurement data D4 indicating the measured steam E4 to the operation assistance device 50. The measurement device 35 measures the power E5 output from the output unit P5 of the energy supply facility 12C. The measurement device 35 transmits measurement data D5 indicating the measured power E5 to the operation assistance device 50. The measurement device 36 measures the power E6 output from the external energy system 80. The measurement device 36 transmits measurement data D6 indicating the measured power E6 to the operation assistance device 50.

The measurement device 37 measures a total value of the power E1, the power E3, the power E5, and the power E6 supplied to the energy, demand facility 11A. Measurement data D7 indicates the total value of the power E1, the power E3, the power E5, and the power E6. The measurement device 37 transmits the measurement data D7 to the operation assistance device 50. The total value of the power E1, the power E3, the power E5, and the power E6 indicates an electricity demand of the energy demand facility 11A. The measurement device 38 measures a total value of the steam E2 and the steam E4 supplied to the energy demand facility 11B. Measurement data D8 indicates the total value of the steam E2 and the steam E4. The measurement device 38 transmits the measurement data D8 to the operation assistance device 50. The total value of the steam E2 and the steam E4 indicates a steam demand of the energy demand facility 11B.

The measurement devices 37 and 38 may not necessarily be installed in the microgrid 10. In this case, the electricity demand of the energy demand facility 11A can be calculated by calculating the total value of the power E1 measured by the measurement device 31, the power E3 measured by the measurement device 33, the power E5 measured by the measurement device 35, and the power E6 measured by the measurement device 36. The electricity demand of the energy demand facility 11B can be calculated by calculating the total value of the steam E2 measured by the measurement device 32 and the steam E4 measured by the measurement device 34.

In the present disclosure, the microgrid 10 illustrated in FIG. 1 is given as an example. However, the configuration to which the operation assistance device 50 can be applied is not limited to the microgrid 10 illustrated in FIG. 1. The form of energy, such as power and heat, the type of energy supply facility, and the number of energy supply facilities are not particularly limited. For example, a steam boiler may be adopted as the energy supply facility. In the microgrid 10, any desired method, such as a measurement and calculation method, may be used as a method for obtaining demand for energy and an energy load distribution in each time section.

<Operation Assistance Device>

The operation assistance device 50 provides information for assisting the determination of the operating state of the energy supply facilities 12A, 12B, and 12C constituting the microgrid 10. There are a plurality of energy demands, such as power and steam, in the microgrid 10. The microgrid 10 includes one or more energy supply facilities 12A, 12B, and 12C as means for supplying energy to the plurality of energy demands. The operation assistance device 50 provides information for assisting the operation of the energy supply facilities 12A, 12B, and 12C to the microgrid 10. The operation assistance information includes, for example, the operable range and economic efficiency (cost) for the operating state considering predetermined constraint conditions of the energy supply facilities 12A, 12B, and 12C. The operation assistance device 50 visualizes and displays the operation assistance information to assist the operators 2A, 2B, and 2C of the energy supply facilities 12A, 12B, and 12C.

Figure 2:
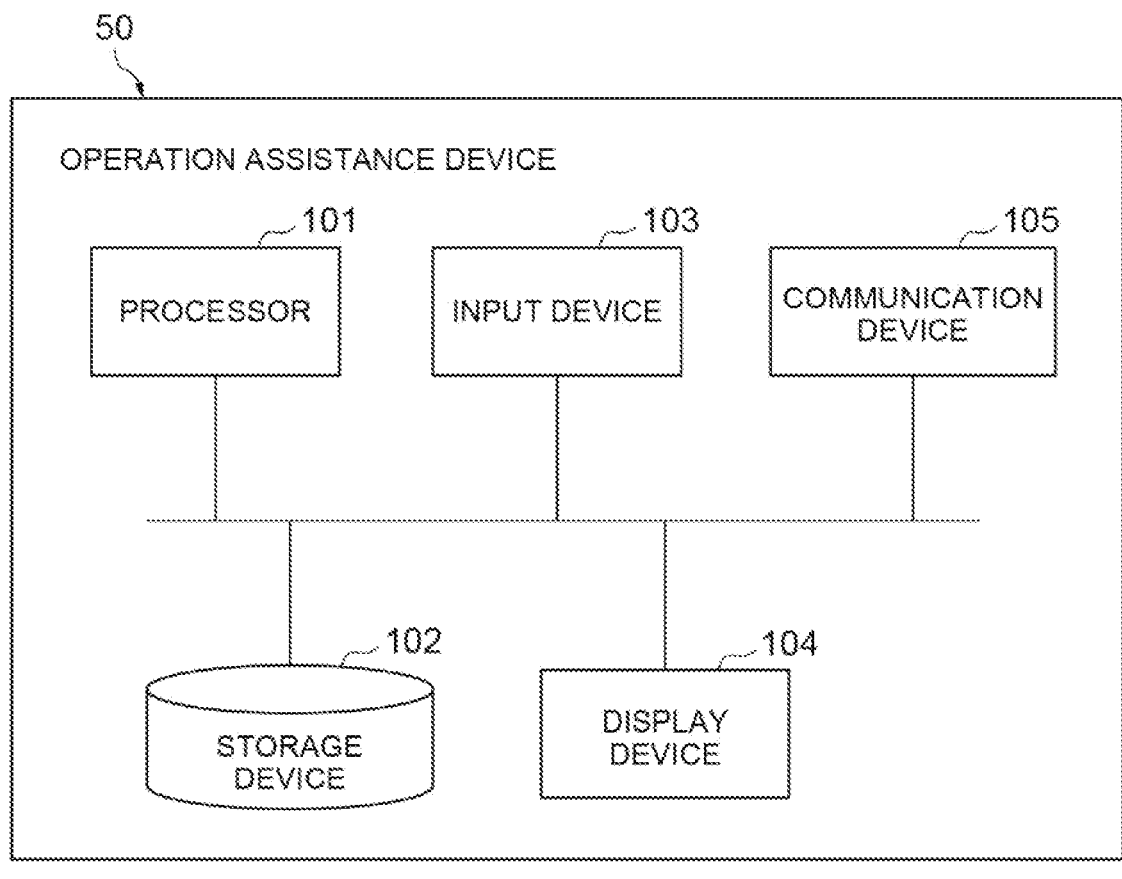
FIG. 2 is a diagram illustrating a physical configuration of the operation assistance device.

The operation assistance device 50 is used to assist the operation of the energy supply facilities 12A, 12B, and 12C. FIG. 2 is a block diagram illustrating a hardware configuration of the operation assistance device 50. As illustrated in FIG. 2, the operation assistance device 50 is physically configured as a computer. The computer includes one or more processors 101, a storage device 102, such as a random access memory (RAM) and a read only memory (ROM), an input device 103, such as a keyboard, a display device 104, such as a display, and a communication device 105 which is a communication interface for transmitting and receiving data. The operation assistance device 50 directs hardware, such as the processor 101, to read a predetermined computer program, thereby operating each hardware component under the control of the processor 101. In addition, the operation assistance device 50 reads and writes data from and to the storage device 102. Each function of the operation assistance device 50 illustrated in the following FIG. 3 is implemented by these operations.

Figure 3:
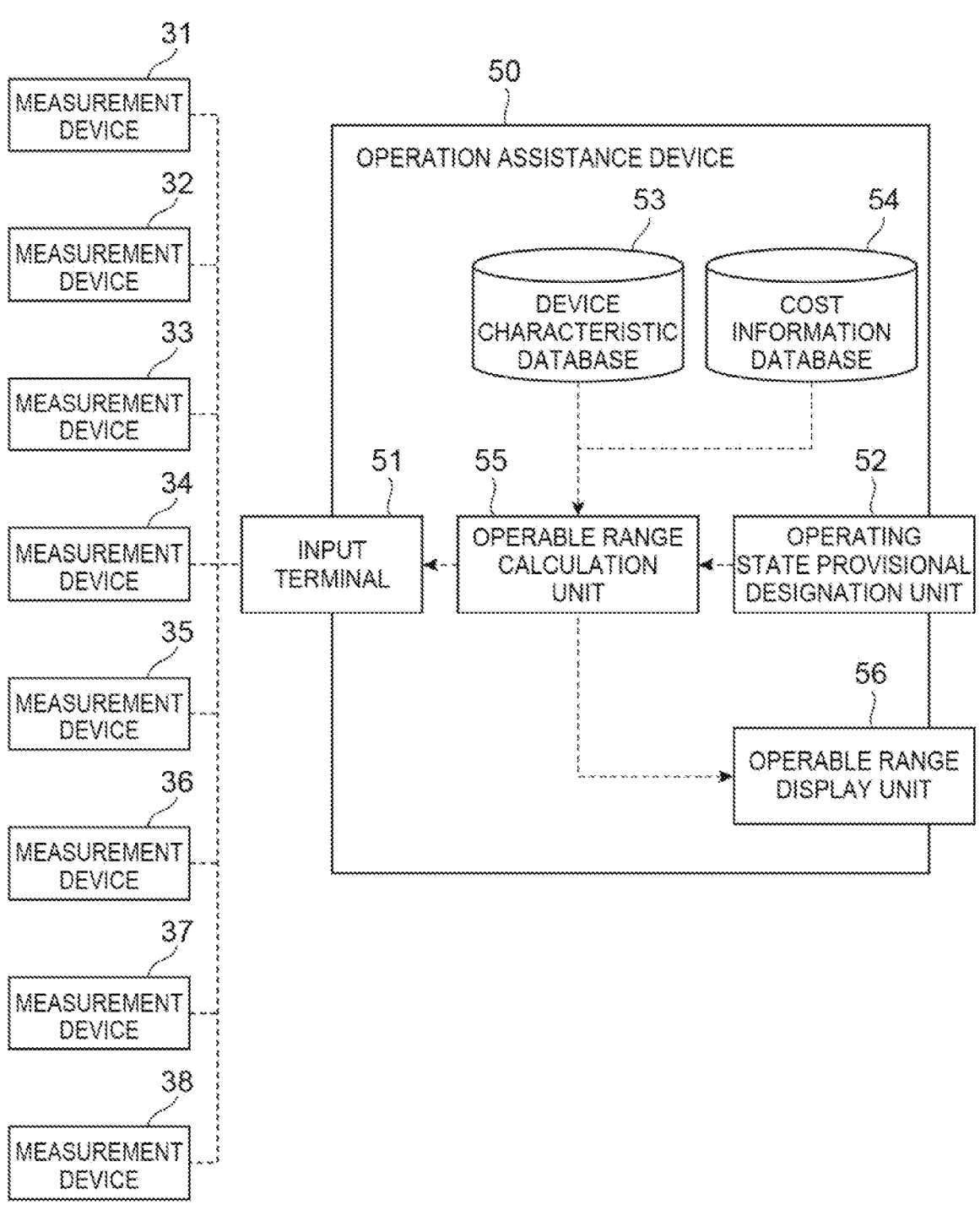
FIG. 3 is a functional block diagram illustrating the operation assistance device.

FIG. 3 is a block diagram illustrating a functional configuration of the operation assistance device 50. As illustrated in FIG. 3, the operation assistance device 50 includes an input terminal 51, an operating state provisional designation unit 52, a device characteristic database 53, a cost information database 54, an operable range calculation unit 55, and an operable range display unit 56.

The input terminal 51 receives the measured values from the measurement devices 31, 32, 33, 34, 35, 36, 37, and 38. The input terminal 51 provides the received measured values to the operable range calculation unit 55. The input terminal 51 may receive calculated values instead of the measured values.

The operating state provisional designation unit 52 receives information indicating a provisional operating state input from the operators 2A, 2B, and 2C. Therefore, the operating state provisional designation unit 52 corresponds to the input device 103 and the communication device 105 illustrated in FIG. 2. For example, the operating state provisional designation unit 52 may be a keyboard which is the input device 103. The operating state provisional designation unit 52 may be a display device which is the operable range display unit 56 which will be described below. In a case in which the operating state provisional designation unit 52 is a display device, information indicating the provisional operating state is input by a touch operation on the display device. The operating state provisional designation unit 52 is used to obtain the influence of increasing the power E1 to 1500 kW when 1000 kW is output as the power E1 from the output unit P1 of the energy supply facility 12A. For example, the influence of the increase in the power E1 to 1500 kW on the steam E2 is obtained. The influence of the increase in the power E1 of the energy supply facility 12A to 1500 kW on the operable ranges of the other energy supply facilities 12B, 12C is obtained.

The device characteristic database 53 stores a mathematical model and parameters included in the mathematical model. The mathematical model simulates the inputs and outputs of the energy supply facilities 12A, 12B, and 12C to be optimized. An expression related to efficiency is given as an example of the mathematical model.

Parameters included in the expression related to efficiency are given as examples of the parameters included in the mathematical model. The cost information database 54 stores parameters necessary for evaluating economic efficiency for the operating state. For example, information, such as a power unit price and a fuel unit price, is given as an example. Therefore, the device characteristic, database 53 and the cost information database 54 correspond to the storage device 102 illustrated in FIG. 2.

The operable range calculation unit 55 calculates the operation assistance information based on some of the input information. The operable range calculation unit 55 provides the calculated information to the operable range display unit 56. The operable range calculation unit 55 corresponds to the processor 101 illustrated in FIG. 2. Some of the input information is, for example, the provisional operating states of the energy supply facilities 12A, 12B, and 12C designated by the operators 2A, 2B, and 2C input from the operating state provisional designation unit 52. Another example of the input information is the current values which have been acquired by the measurement devices 31, 32, 33, 34, 35, 36, 37, and 38 and input from the input terminal 51. The current values input from the input terminal 51 may be values obtained by performing a predetermined calculation process on the measured values. For example, the value obtained by performing the predetermined calculation process is a time average value of a plurality of current values (instantaneous values) acquired for a predetermined period of time. Yet another example of the input information may be the models of the energy supply facilities 12A, 12B, and 12C and parameters of the models which are stored in the device characteristic database 53. Still another example of the input information may be cost information stored in the cost information database 54.

The operation assistance information includes, for example, an inoperable region, an operable range, cost information, and the like. The operable range is a set of operation conditions that can satisfy the device constraints of the energy supply facilities 12A, 12B and 12C and constraints on energy demand. The device constraints include, for example, constraints on the minimum output of the energy supply facilities 12A, 12B, and 12C, the maximum output of the energy supply facilities 12A, 12B and 12C, and the total amount of the power output and thermal output of the cogeneration system of a variable heat-to-power ratio type. The constraints on energy demand include satisfying the demand of the microgrid 10, not exceeding contracted power, prohibiting the reverse power flow, and the like. The cost information includes current cost information, provisional cost information, and the like. The current cost information is obtained by calculation based on the current operating state input from the input terminal 51. The provisional cost information is obtained by calculation based on the current cost information and the provisional operating state input from the operating state provisional designation unit 52.

The operable range may be calculated by a desired mathematical optimization technique. It is generally difficult to indicate the operable range as a specific numerical range (for example, 1000 kW or more and 1500 kW or less) as a solution to the optimization problem. On the other hand, it is possible to assume a plurality of possible operating states and to determine whether or not there is a solution that satisfies constraint conditions for the assumed operating states. Therefore, a method may be adopted which determines whether or not there is a solution that satisfies the constraint conditions to approximately obtain the operable range.

The operable range display unit 56 outputs the operation assistance information provided from the operable range calculation unit 55 in a predetermined format. The operable range display unit 56 corresponds to the display device 104 or the communication device 105 illustrated in FIG. 2. The display operation performed by the operable range display unit 56 will be described below. Any means that can display the operable range may be adopted as the operable range display unit 56. For example, the operable range display unit 56 may be a display device such as a liquid crystal display.

The operable range display unit 56 may be a display device included in a mobile terminal such as a smartphone. The operable range display unit 56 may be a printer. The operable range display unit 56 may be any device that prints the operable range on a sheet of paper and outputs the sheet of paper.

<Operation>

Figure 4:
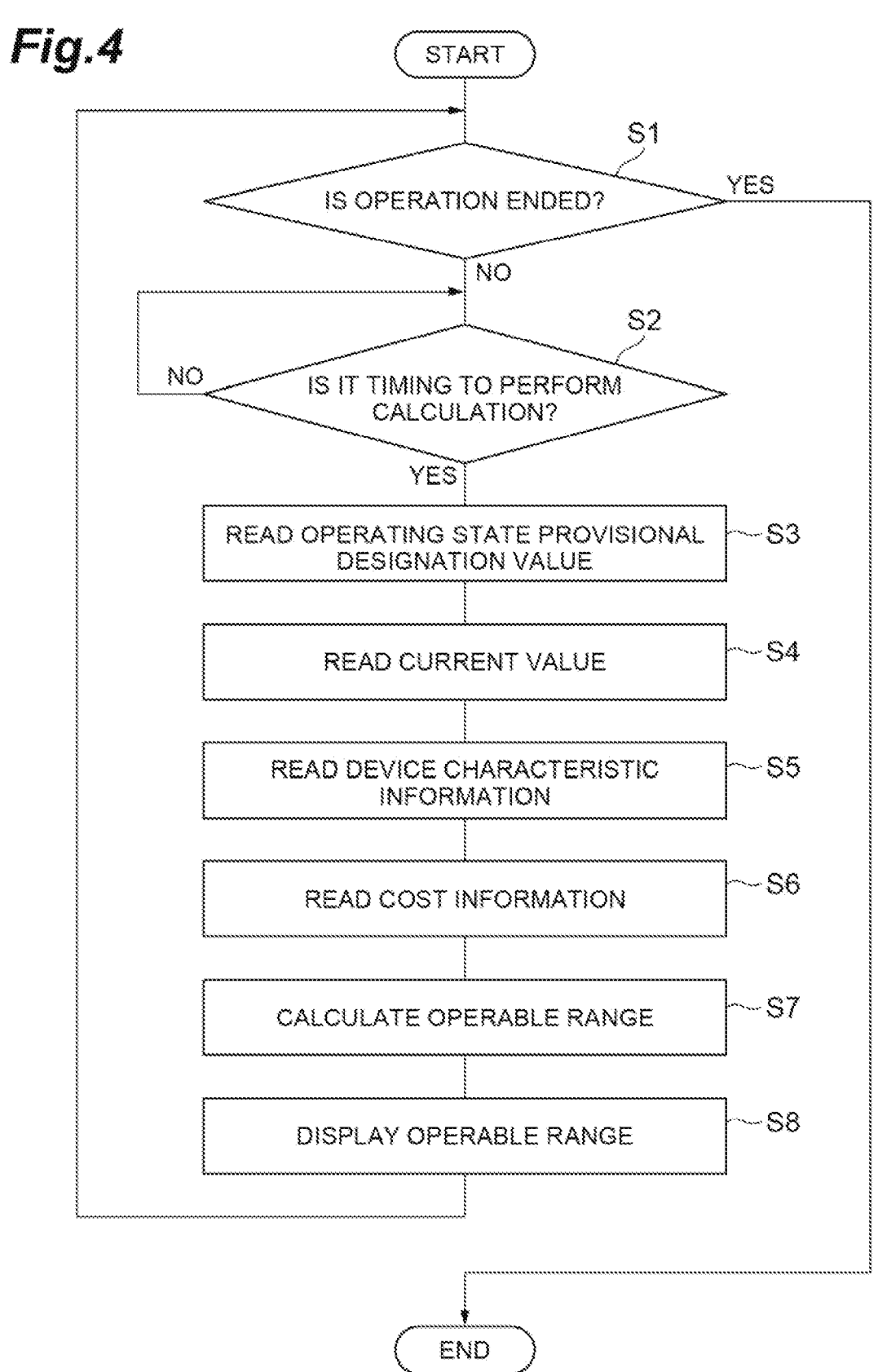
FIG. 4 is a flowchart illustrating an operation of the operation assistance device.

Next, the operation flow of the operation assistance device 50 will be described with reference to FIG. 4. First, the operation assistance device 50 determines whether or not to end the assistance operation after the assistance operation is started (Step S1). In a case in which it is determined that the assistance operation is ended (Step S1: YES), the assistance operation is ended. On the other hand, in a case in which it is determined that the assistance operation is not ended (Step S1: NO), the operation assistance device proceeds to the next Step S2.

Then, it is determined whether or not it is dining to calculate the operation assistance information (Step S2). The calculation may be performed at preset time intervals. The timing when the calculation is performed may be based on instructions from the operators 2A, 2B, and 2C. The timing when the operation assistance device 50 calculates the operation assistance information may correspond to both a predetermined timing and a designated timing.

In a case in which it is determined that it is not timing to perform the calculation (Step S2: NO), the operation assistance device waits until the timing to perform the next calculation. After waiting, the operation assistance device performs Step S2 again. In a case in which it is determined that it is timing to perform the calculation (Step S2: YES), the operation assistance device proceeds to the next Step S3.

Then, an operating state provisional designation value is read (Step S3). Step S3 is performed by the operating state provisional designation unit 52. Then, the current value is read (Step S4). Step S4 is performed by the input terminal 51. Then, the device characteristic information is read (Step S5). Step S5 is performed by the device characteristic database 53. Then, the cost information is read (Step S6). Step S6 is performed by the cost information database 54.

Then, calculation for obtaining the operable range is performed using various types of information read in Steps S3 to S6 (Step S7). Step S7 is performed by the operable range calculation unit 55. The operable range calculation unit 55 provides the operable range display unit 56 with information indicating the operable range which is the result of the calculation. The operable range is displayed as the operation assistance information (Step S8). Step S8 is performed by the operable range display unit 56. Then, the operation continues again from Step S1.

Hereinafter, the operation of the operable range display unit 56 will be described in detail.

<Energy Supply Facility 12A (Cogeneration System of Variable Heat-to-Power Ratio Type)>

Figure 5:
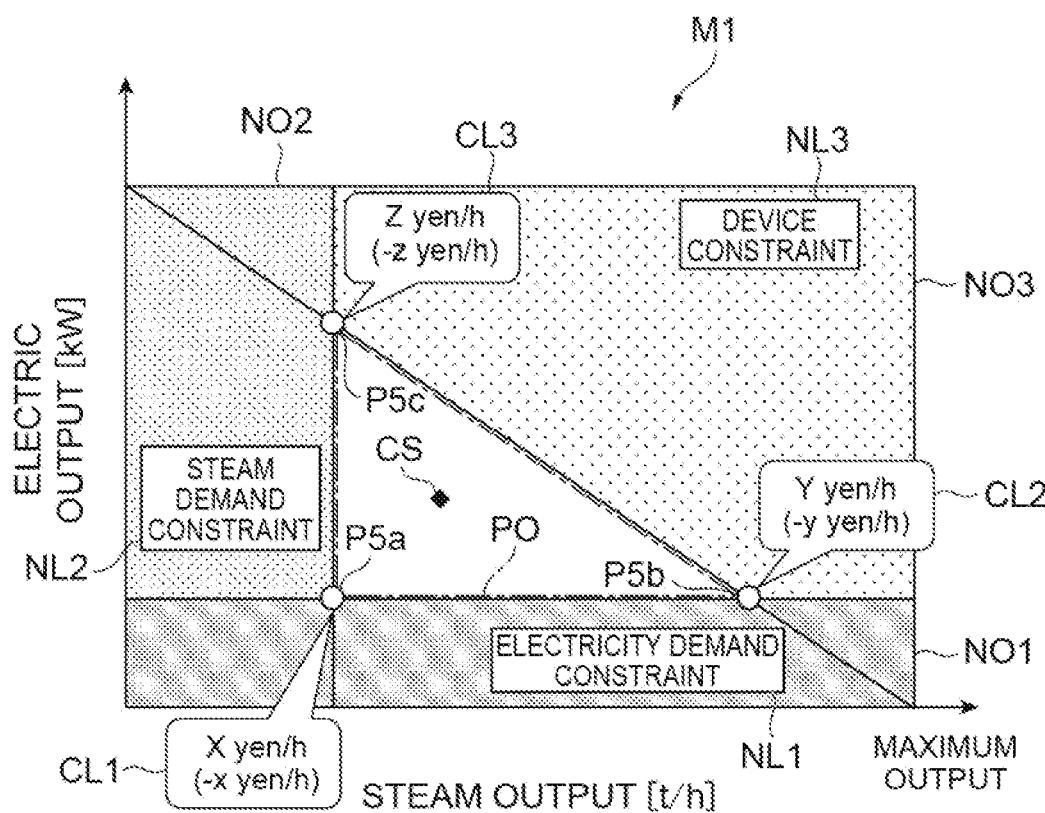
FIG. 5 illustrates an example of an operation map corresponding to an energy supply facility which is a cogeneration system of a variable heat-to-power ratio type.

FIG. 5 illustrates an operation map M1. The operation map M1 relates to the energy supply facility 12A by the operable range display unit 56. The energy supply facility 12A is a cogeneration system of a variable heat-to-power ratio type. The cogeneration system of a variable heat-to-power ratio type can freely set the ratio of an electric output and a steam output (heat) obtained by burning fuel to some extent. The operable range display unit 56 shows the two-dimensional operation map M1. The horizontal axis of the operation map M1 indicates the steam output (heat). The vertical axis of the operation map M1 indicates the electric output. The operation map M1 shows a current operating state CS. The operation map M1 may show an assumed operating state as needed. In the operation map M1, the current operating state CS may be omitted and only the assumed operating state may be shown. The operation map M1 shows a first inoperable region NO1, a second inoperable region NO2, and a third inoperable region NO3. The first inoperable region NO1 is a constraint based on electricity demand. The second inoperable region NO2 is a constraint based on steam demand. The third inoperable region NO3 is a constraint based on a device. In the operation map M1 the first inoperable region NO1, the second inoperable region NO2, and the third inoperable region NO3 are displayed so as to be superimposed. A non-overlapping region that does not overlap any of the first inoperable region NO1, the second inoperable region NO2, and the third inoperable region NO3 appears. The non-overlapping region is an operable region PO that satisfies all of the electricity demand, the steam demand, and the device constraints. The operator 2A of the energy supply facility 12A can intuitively understand that the energy supply facility 12A needs be operated such that the current operating state CS (the power E1 and the steam E2) of the energy supply facility 12A is present in the operable region PO.

In the operation map M1 illustrated in FIG. 5, the energy (electric output) indicated by the vertical axis and the energy (steam output) indicated by the horizontal axis are different from each other. In the two-dimensional operation map, the energy indicated by the vertical axis and the energy indicated by the horizontal axis are not necessarily different from each other. The energy indicated by the vertical axis and the energy indicated by the horizontal axis may be of the same type (for example, the electric output).

The operation map M1 may show what kind of constraints each of the first inoperable region NO1, the second inoperable region NO2, and the third inoperable region NO3 is based on. For example, a first constraint label NL1 is attached to the first inoperable region NO1. The first constraint label NU indicates that the first inoperable region NO1 is based on the electricity demand. Similarly, a second constraint label NL2 is attached to the second inoperable region NO2. Similarly, a third constraint label NL3 is attached to the third inoperable region NO3. The first constraint label NL1, the second constraint label NL2, and the third constraint label NL3 enable the operator 2A to easily identify factors that narrow the operable region PO.

The operation map M1 may further show other information. Specifically, the operation map M1 may show information related to an operation cost. The operator 2A of the energy supply facility 12A may desire to understand the operating state in which the operation cost is optimum from the operable region PC). Uncertainties, such as the uncertainty of fluctuations in energy demand and an operation margin, are considered to determine the operating state considering the operation cost. When the operating state is determined considering the operation cost, the consideration of deterministic factors can be treated as a mathematical optimization problem to solve a solution. However, when the operating state is determined considering the operation cost, the operating state in which the operation cost is optimum is typically present on a constraint boundary in many cases. Therefore, the operation cost for achieving the operating state on the constraint boundary indicated by the operation map M1 is significant operation assistance information for the operator 2A.

For example, a first boundary operating state P5$a$ in which the conditions of the first inoperable region NO1 and the second inoperable region NO2 are matched with each other is given as an example. In this case, a first cost label CU may include the electric output shown in the first boundary operating state P5$a$ and a first operation cost (X yen/h) required to obtain the steam output. The first cost label CL1 may include a difference value (–x yen/h) between the operation cost in the current operating state CS and the operation cost in the first boundary operating state P5$a$.

A second boundary operating state P5$b$ in which the conditions of the first inoperable region NO1 and the third inoperable region NO3 are matched with each other is given as an example. In this case, a second cost label CL2 may include a second operation cost (Y yen/h) and a cost difference value (–y yen/h) from the current operating state CS. A third boundary operating state P5$c$ in which the conditions of the second inoperable region NO2 and the third inoperable region NO3 are matched with each other is given as an example. In this case, a third cost label GU may include a third operation cost. (ZZ yen/h) and a cost difference value (–z yen/h) from the current operating state CS.

The operating states having the cost labels attached thereto are not limited to the first boundary operating state P5$a$, the second boundary operating state P5$h$, and the third boundary operating state P5$c$. For example, for any operating state selected by the operator 2A on the operation map M1, an operation cost for achieving the selected operating state may be shown. An operation cost for achieving the current operating state CS may also be displayed.

In a case in which a solution obtained by mathematical optimization is displayed, in general, only a single solution is shown. On the other hand, the display of information given as an example in the operation map M1 has the advantage that it is possible to compare and examine a plurality of operating states. For example, the operator 2A who has referred to the operation map M1 can determine the following: "When the current operating state CS is compared with the assumed operating state, the current operating state CS is advantageous in terms of the operation cost. However, the difference from the operation cost in the assumed operating state is slight. The assumed operating state can flexibly respond to future demand fluctuations. Therefore, the assumed operating state is more preferable, comprehensively considering the operation cost and response to demand fluctuations."

Modification Example

Figure 6:
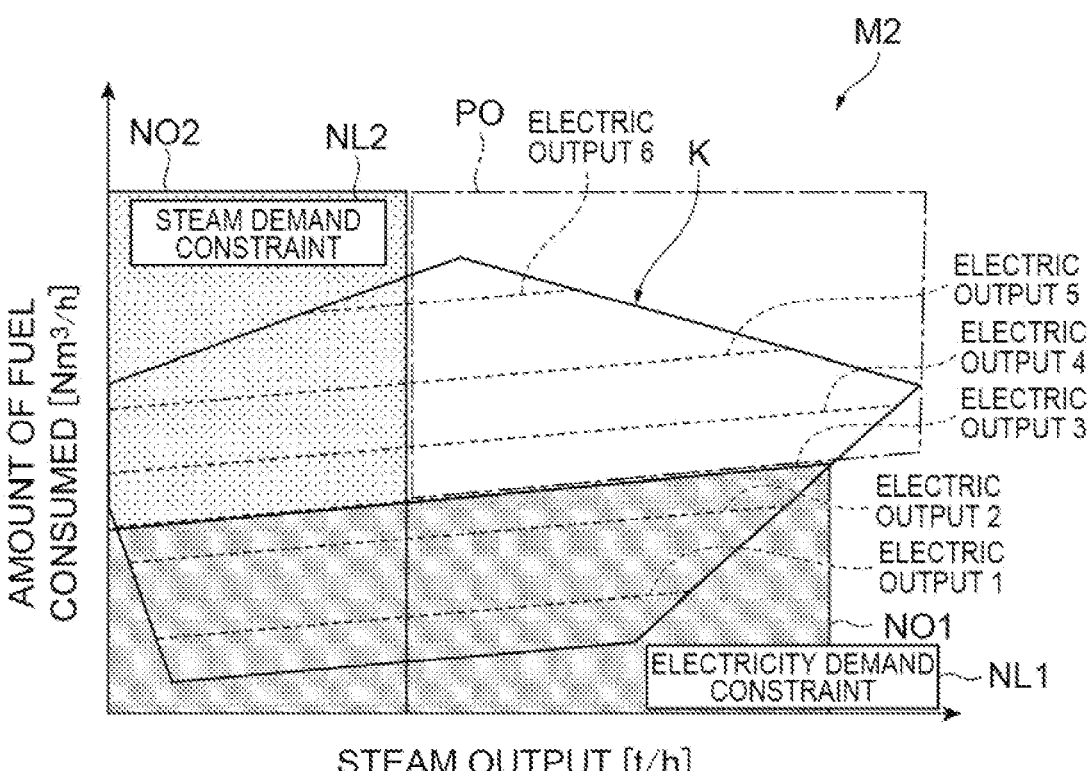
FIG. 6 illustrates another example of the operation map corresponding to the energy supply facility which is the cogeneration system of the variable heat-to-power ratio type.

The operation map corresponding to the cogeneration system of a variable heat-to-power ratio type may have a form illustrated in FIG. 6. The horizontal axis of an operation map M2 illustrated in FIG. 6 indicates a steam output. The vertical axis of the operation map M2 indicates fuel consumption. The operation map M2 shows a series K related to typical power generation. Even in this display form, for example, the operable region PO that satisfies the constraints on electricity demand (first inoperable region NO1) and steam demand (second inoperable region NO2) can be displayed in a desired aspect.

<Energy Supply Facility 12B (Cogeneration System of Fixed Heat-to-Power Ratio Type)>

Figure 7:
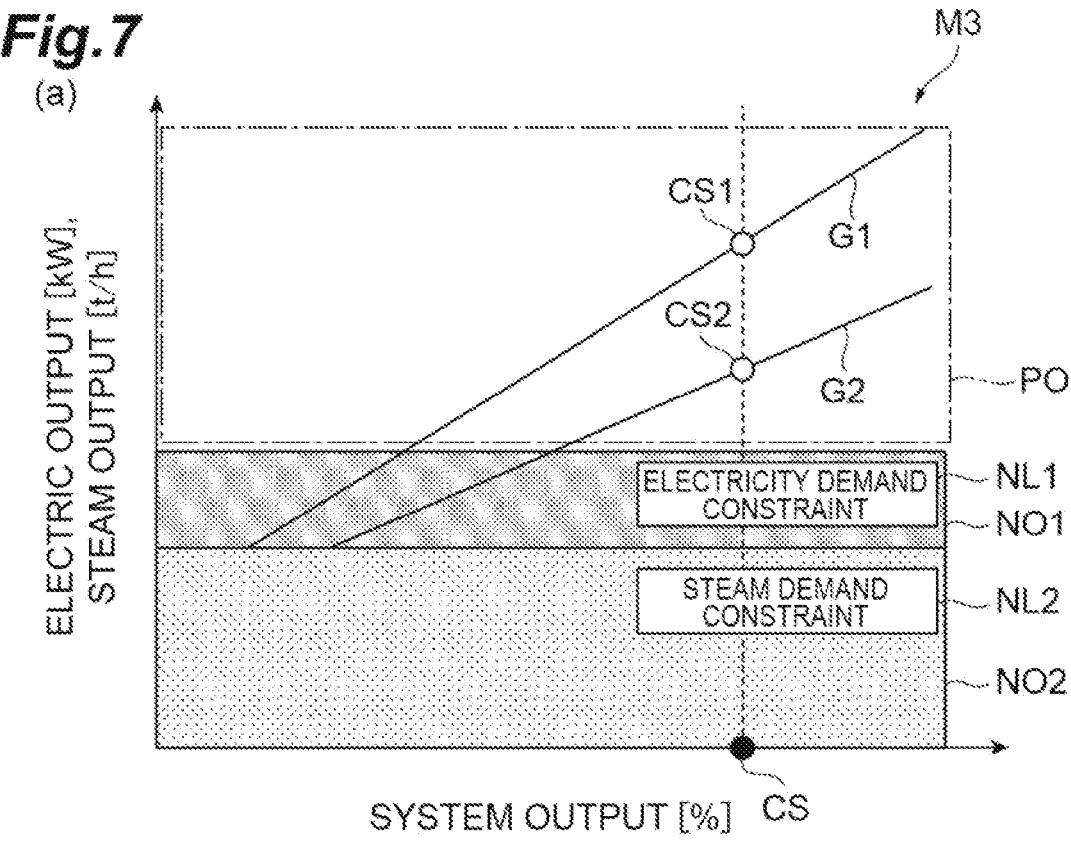
FIG. 7(*a*) illustrates an example of an operation map corresponding to an energy supply facility which is a cogeneration system of a fixed heat-to-power ratio type.
Figure 7:
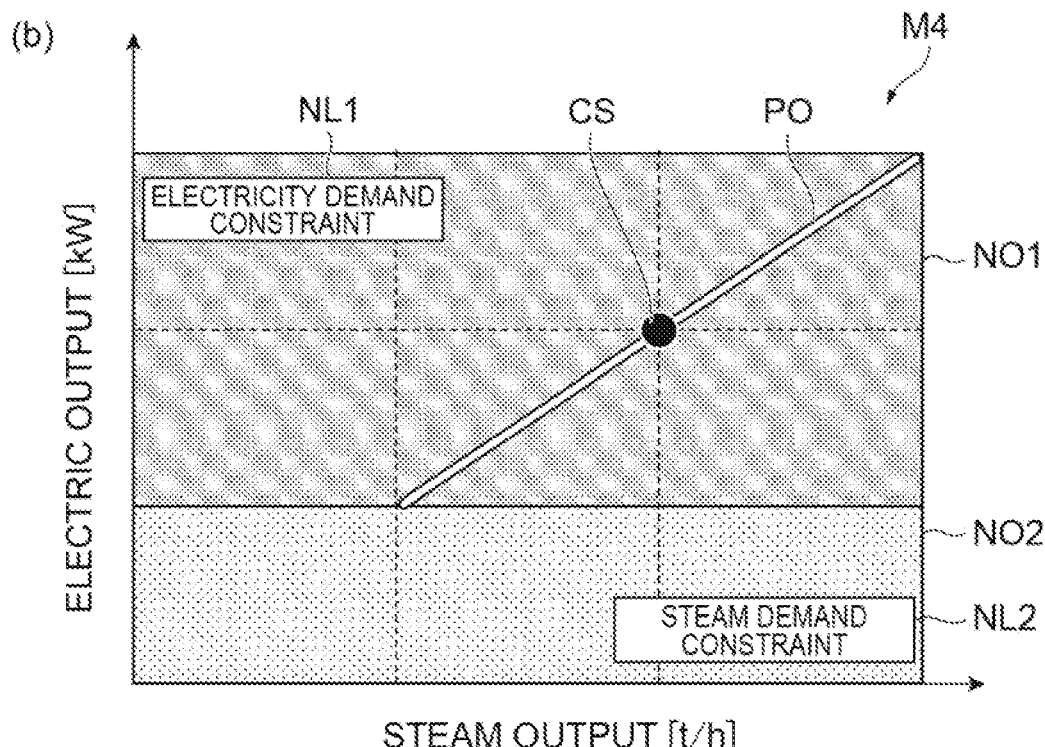

FIG. 7($a$) illustrates an operation map M3 related to the energy supply facility 12B by the operable range display unit 56. The energy supply facility 12B is a cogeneration system of a fixed heat-to-power ratio type. In the cogeneration system of a fixed heat-to-power ratio type, the ratio of an electric output and a thermal output (steam) obtained by burning fuel is generally constant. The operable range display unit 56 displays the two-dimensional operation map M3. The horizontal axis of the operation map M3 indicates a system output. The vertical axis of the operation map M3 indicates the electric output and the steam output. The operation map M3 shows the first inoperable region NO1 and the second inoperable region NO2. In the operation map M3, the current operating state CS is shown on the horizontal axis. A graph G1 of the operation map M3 shows the electric output. A graph G2 of the operation map M3 shows the steam output. In the cogeneration system of a fixed heat-to-power ratio type, the ratio of the steam output to the electric output is constant. Therefore, when the system output shorn on the horizontal axis is determined, an electric output CS1 and a steam output CS2 are automatically determined. The operator 2B can refer to the first inoperable region NO1 based on the electricity demand constraints and the second inoperable region NO2 based on the steam demand constraints shown in the operation map M3. Therefore, the operator 2B can understand the operable region PO that can satisfy the electricity demand constraints and the steam demand constraints.

Parameters shown on the horizontal and vertical axes of the operation map M3 in FIG. 7(a) are different from the parameters shown on the horizontal and vertical axes of the operation map M1 related to the enemy supply facility 12A. For example, as illustrated in FIG. 7(b), the energy supply facility 12B may adopt an operation map M4. The horizontal axis of the operation map M4 indicates a steam output. The vertical axis of the operation map M4 indicates an electric output.

Figure 8:
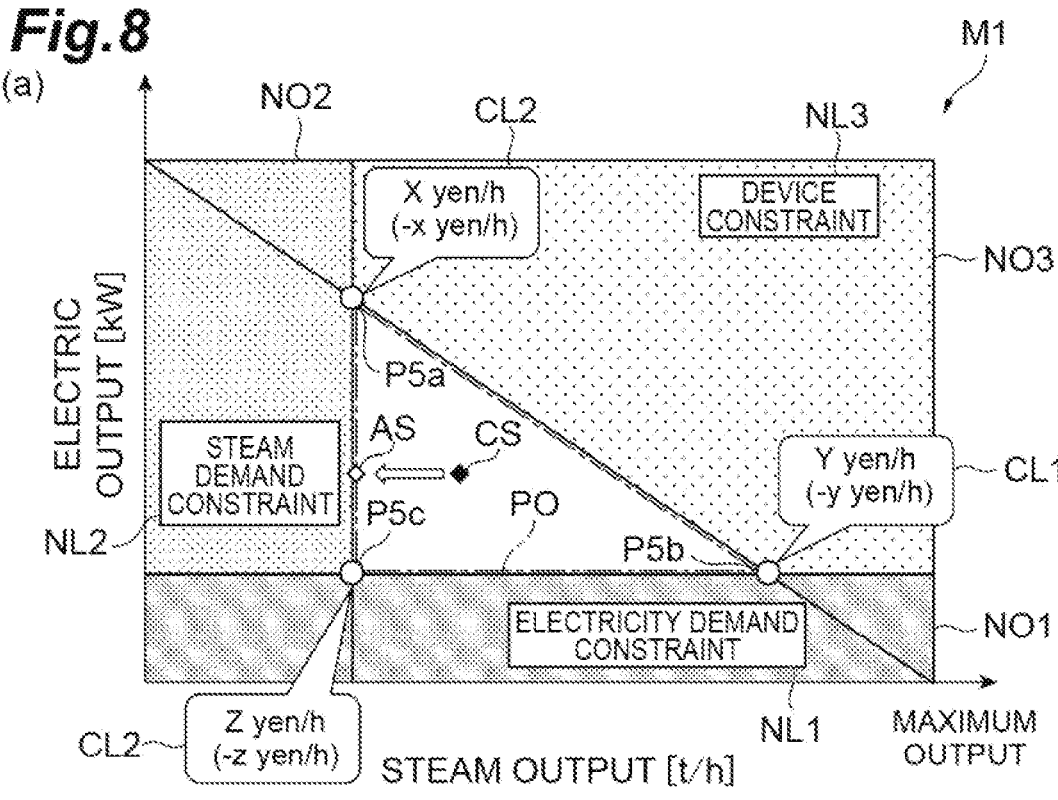
FIG. 8(*a*) illustrates an example of an operation map corresponding to an energy supply facility which is a cogeneration system of a variable heat-to-power ratio type.
Figure 8:
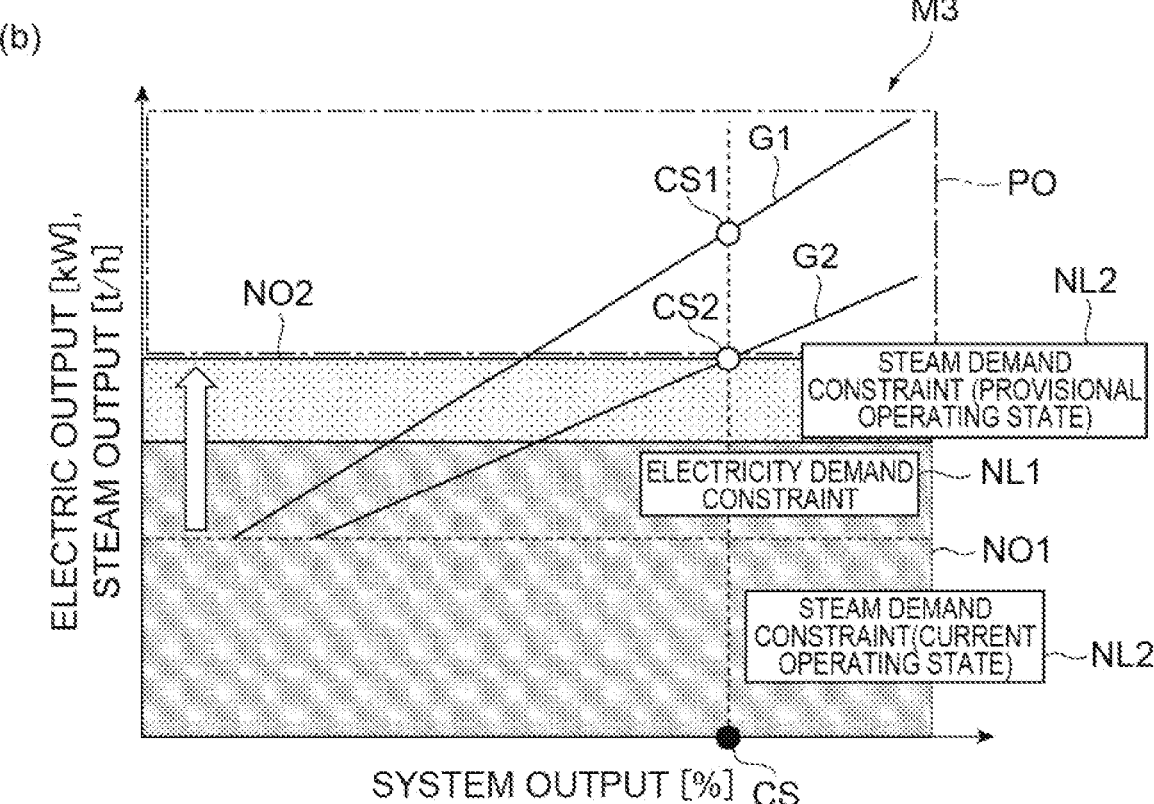

The operation map M1 related to the energy supply facility 12A and the operation map M3 related to the energy supply facility 12B may be operatively associated with each other. For example, as illustrated in FIG. 8(a), it is assumed that the operator 2A inputs a provisional operating state AS for the current operating state CS in the operation map M1. In the example illustrated in FIG. 8(a), in the provisional operating state AS, the steam output is reduced from the current operating state CS. As illustrated in the operation map M3 of FIG. 8(b), the steam output required of the energy supply facility 12B increases as the steam output of the energy supply facility 12A decreases. The steam demand constraints (second inoperable region NO2) become severe. In other words, the lower limit of the steam output shown as the steam demand constraint increases. In a case in which the operating state of any supply device among the energy supply facilities 12A, 12B, and 12C is designated, the influence of the designated supply device may be reflected as constraints on other supply devices.

<Energy Supply Facility 12C (Storage Battery)>

Figure 9:
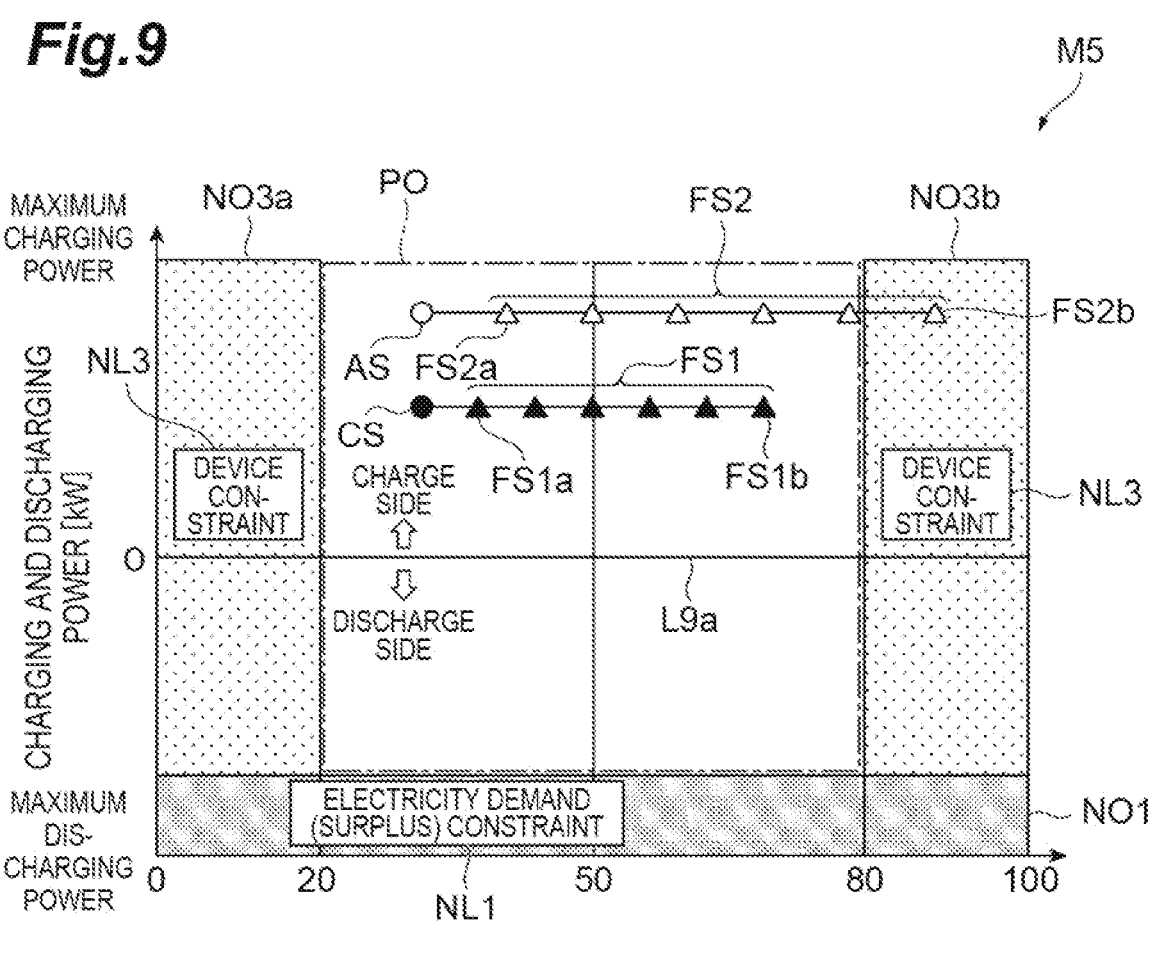
FIG. 9 illustrates an example of an operation map corresponding to an energy supply facility which is a storage battery.

FIG. 9 illustrates an operation map M5 related to the energy supply facility 12C by the operable range display unit 56. The energy supply facility 12C is a storage battery. The storage battery can be charged with a portion of the power output from the energy supply facilities 12A and 12B. The storage battery can supply (discharge) power to the energy demand facility 11B. The operation of the storage battery is managed using a state of charge (SoC). The horizontal axis of the operation map M5 illustrated in FIG. 9 indicates state of charge. The minimum value of the state of charge is 0%. The maximum value of the state of charge is 100%. The vertical axis of the operation map M5 indicates charging power and discharging power. On the vertical axis, a side above a line L9a indicating 0 kilowatts is shown as a charge side. A side below the line L9a indicating 0 kilowatts is shown as a discharge side. In the operation map M5, the first inoperable region. NO1 and third inoperable regions NO3a and NO3b are shown. The third inoperable regions NO3a and NO3b are based on the device constraints. The third inoperable regions NO3a and NO3b are set from the viewpoint of ensuring an operation margin of the storage battery. In the example of the operation map M5 illustrated in FIG. 9, a region in which the state of charge is equal to or greater than 0% and less than 20% is shown as one third inoperable region NO3a—A region in which the state of charge is equal to or greater than 80% and equal to or less than 100% is shown as the other third inoperable region NO3b. In other words, in the operable region PO, the state of charge is equal to or greater than 20% and equal to or less than 80%. In the operation map M5, the first inoperable region NO1 based on electricity demand constraints is also shown.

In the operation map M5, in addition to the current operating state CS, a future operating state FS1 is shown. The future operating state FS1 indicates a change in the state of charge over time when the current operating state CS in which predetermined charging power is applied is maintained. The future operating state FS1 is a temporal prediction value. In the operation map M5, the state of charge for every hour is indicated by some markers. A marker FS1a indicates the state of charge after one hour from now. A marker FS1b indicates the state of charge after 6 hours from now. The operator 2C who has referred to the operation map M5 can know that the operable state can be maintained even after 6 hours when the charging power in the current operating state CS is maintained.

A future operating state FS2 may also be shown for the provisional operating state AS. In the operation map M5, the state of charge for every hour when the provisional operating state AS is maintained is indicated by some markers. A marker FS2a indicates the state of charge after one hour from now. A marker FS2b indicates the state of charge after 6 hours from now. The operator 2C who has referred to the operation map M5 can know that, when the charging power in the provisional operating state AS is maintained, the operating state enters the third inoperable region NO3b after 6 hours. The operator 2C can know deviation from operational constraint conditions.

In the example shown in the operation map M5, the future operating states FS1 and FS2 are based on the premise that the current operating state CS or the provisional operating state AS is maintained for a predetermined period. For example, the operating state can also be set for every hour. For example, it may be set to maintain the charging power in the current operating state CS after two hours from now. In addition, it may be set to maintain the charging power in the provisional operating state AS after 2 hours to 6 hours from now. The periods indicated by the future operating states FS1 and FS2 and the timings indicated by the markers can be appropriately set. The periods indicated by the future operating states FS1 and FS2 are not limited to 6 hours. The periods indicated by the future operating states FS1 and FS2 may be appropriately set by the operator 2C. The timing indicated by the marker is not limited to every hour. The timing indicated by the marker may be set to every 30 minutes. The timing indicated by the marker may be set to every two hours. The timing indicated by the marker may be variable. For example, the timing indicated by the marker may be every hour in the near future and every 30 minutes in the distant future.

<Operation and Effect>

However, in some cases, factories that constantly consume a large amount of energy, such as electricity or steam, have their own energy devices, such as cogeneration systems, in order to stabilize energy supply and to reduce energy costs. The task of the energy devices in the factories is to operate optimally according to the energy demand. The optimal operation is, for example, an operating state in which energy costs are minimized. Techniques for visualizing the energy demand and the operating state of energy devices are being actively developed. In addition, techniques for assisting the optimum operation of the energy devices are also being actively developed. A system implementing these techniques is called an energy management system (EMS). A large number of techniques including a technique using a mathematical optimization method have already been proposed as a technique for calculating the optimum operating state of energy devices constituting a microgrid.

A major concern in the operation of the energy devices is a reduction in energy cost. The operating state of the energy devices in which the energy cost is minimized is obtained by solving a mathematical optimization problem formulated with the energy cost as an objective function. For this purpose, the EMS proposed in Patent Literature 1 (Japanese Patent No. 5179423) is effective. However, in the operation of the energy devices, it is necessary to consider, for example, the uncertainty of fluctuations in energy demand in addition to energy costs. In addition, in the operation of the energy devices, it is necessary to consider, for example, the securement of an operation margin. It is difficult to formulate the optimization problem considering these factors. In this case, the EMS generally considers various constraints and only shows, for example, the operable range (first item) of the energy devices and the economic efficiency (second item) that can be achieved in each operating state in the operable range. It is considered that there are many cases in which it is more rational for the operator to directly operate the energy devices using these factors as criteria for determination.

Patent Literature 2 (Japanese Unexamined Patent Publication No. 2017-156963) is given as an example of a technique for partially solving this problem. Patent Literature 2 proposes a technique, for visualizing the relationship between constraint conditions and objective variables in order to assist the optimum operation of energy devices. However, the purpose of the technique disclosed in Patent Literature 2 is to specify and quantify constraints that contribute to cost improvement. Therefore, in the technique disclosed in Patent Literature 2, it is not possible to visualize the first and second items.

The operation assistance device 50 assists the operation of the plurality of energy supply facilities 12A, 12B, and 12C, each of which outputs energy to the energy demand facility 11. The operation assistance device 50 includes the operable range calculation unit 55 that calculates constraint conditions on each of the plurality of energy supply facilities 12A, 12B, and 12C on the basis of matters caused by the energy demand facility 11 and matters caused by the energy supply facilities 12A, 12B, and 12C and the operable range display unit 56 that displays the constraint conditions and also displays the current operating states of the energy supply facilities 12A, 12B, and 12C and the assumed operating states different from the current operating states.

The operation assistance device 50 and the operation assistance program assist the operation of the microgrid 10 having the energy supply facilities 12A, 12B, and 12C as supply means for a plurality of energy demands such as power and steam. The operation assistance device 50 and the operation assistance program visualize and display, for example, the operable range and economic efficiency for a plurality of operating states considering the constraint conditions of the energy supply facilities 12A, 12B, and 12C. The operation assistance device 50 and the operation assistance program assist the operation of the energy supply facilities 12A, 12B, and 12C by the operators 2A, 2B, and 2C, using the visualization and display.

In other words, the operation assistance device 50 and the operation assistance program provide information for optimizing the operation of the energy supply facilities 12A, 12B, and 12C in the microgrid 10 having the controllable energy supply facilities 12A. 12B, and 12C. The operation assistance device 50 and the operation assistance program calculate the operable range that can satisfy various constraints, such as device constraints which are hardware constraints and constraints on energy supply and demand, for the energy supply facilities 12A, 12B, and 12C. The operation assistance device 50 and the operation assistance program superimpose the operable range on the operation map according to the characteristics of the energy supply facilities 12A, 12B, and 12C.

The operation assistance device 50 and the operation assistance program can display information, in which the constraint conditions, the current operating state, and the assumed operating state have been displayed together, to the operators 2A, 2B, and 2C who operate the energy supply facilities 12A, 12B, and 12C, respectively. The operators 2A, 2B, and 2C refer to information based on the displayed calculation results. Then, the operators 2A, 2B, and 2C add their own determinations to the information referred to by the operators. As a result, the operators 2A, 2B, and 2C can determine the final operating states of the energy supply facilities 12A, 12B, and 12C. Therefore, it is possible to perform the operation in which the determinations of the operators 2A, 2B, and 2C have been further incorporated into the results of the calculation.

The operable range calculation unit 55 calculates first energy constraint conditions imposed on first energy and second energy constraint conditions imposed on second energy. The operable range display unit 56 displays the current operating state and the assumed operating state in a two-dimensional display region having at least one of the first energy and the second energy as a variable. The operable range display unit 56 displays both a range based on the first energy constraint conditions and a range based on the second energy constraint conditions. This configuration makes it possible to display the operating state and the constraint conditions as a two-dimensional map to the operators 2A, 2B, and 2C. As a result, the operators 2A, 2B, and 2C can easily understand the relationship between operating state and the constraint conditions.

The operable range calculation unit 55 calculates a change in the current operating state over time and a change in the assumed operating state over time. This configuration enables the operators 2A, 2B, and 2C to operate the energy supply facilities 12A, 12B, and 12C in consideration of the future operating state.

The operable range calculation unit 55 calculates a first facility constraint condition imposed on the first energy supply facility and a second facility constraint condition imposed on the second energy supply facility. The operable range display unit 56 sets a first display region and a second display region different from the first display region. The operable range display unit 56 displays the first facility constraint condition in the first display region. The operable range display unit 56 displays the second facility constraint condition in the second display region. This configuration makes it possible to perform the operation, into which the determinations of the operators 2A, 2B, and 2C have been incorporated, for each of the plurality of energy supply facilities 12A, 12B, and 12C.

The operable range calculation unit 55 calculates an assumed constraint condition imposed on the second energy supply facility on the basis of the assumed operating state of the first energy supply facility. The operable range display unit 56 displays the first facility constraint condition, the current operating state, and the assumed operating state in the first display region. The operable range display unit 56 displays the second facility constraint condition and the assumed constraint condition calculated by the calculation unit in the second display region. This configuration makes it possible to determine the operating state of one energy supply facility 12A while considering the influence of the one energy supply facility 12A on the other energy supply facility 12B.

The operable range display unit 56 further displays cost information for some operating states so as to be superimposed on the operation map M1.

The operable range calculation unit 55 uses points on the constraint boundary as the operating state on which the cost information is displayed so as to be superimposed.

The operable range calculation unit 55 uses any point designated by the operator as the operating state on which the cost information is displayed so as to be superimposed.

In the microgrid 10 having the plurality of energy supply facilities 12A, 12B, and 12C, when the operating state of a certain energy supply facility 12A is provisionally designated, the operable range display unit 56 re-displays the operable range of another energy supply facility 12B following the provisionally designated operating state.

Modification Examples

The operation assistance device according to the present disclosure is not limited to the configuration and the method according to the above-described embodiment.

The operation assistance device 50 only shows the operation assistance information to the operators 2A, 2B, and 2C. The energy supply facilities 12A, 12B, and 12C are operated by the operators 2A, 2B, and 2C, respectively. The operation assistance device 50 may directly output control commands to the energy supply facilities 12A, 12B, and 12C. This configuration enables the operators 2A, 2B, and 2C to determine the operating state with reference to the operation assistance information such as the compliance state of the constraint conditions and the cost information. The operators 2A, 2B, and 2C input the determined operating state to the operation assistance device 50. The operation assistance device 50 may output control commands to the energy supply facilities 12A, 12B, and 12C so as to achieve the input operating state.

In the embodiment, the "operation cost" is given as an example of the information for determining the operating state which is provided to the operators 2A, 2B, and 2C. The information for determining the operating state which is provided to the operators 2A, 2B, and 2C is not limited to the "operation cost". For example, an index, such as "carbon dioxide emissions", may be adopted as the information provided to the operators 2A, 2B, and 2C.

In the embodiment, the future operation information is given as an example for the operation map M5 of the energy supply facility 12C which is a storage battery. A method for visualizing a change over time can also be applied to the operation maps M1, M2, M3, and M4 of the energy supply facilities 12A and 12B. For example, a three-dimensional map may be adopted as the method for visualizing the change over time. A three-dimensional map is obtained by arranging a two-dimensional operation map shown as a single time section in a depth direction which is a time axis. According to the three-dimensional map, the operator 2A can select a desired time section to display a two-dimensional operation map in the selected time section. Electricity demand and power surplus generally depend on the passage of time. This display method makes it possible to easily check compliance with constraint conditions and cost information in the future.

Figure 10:
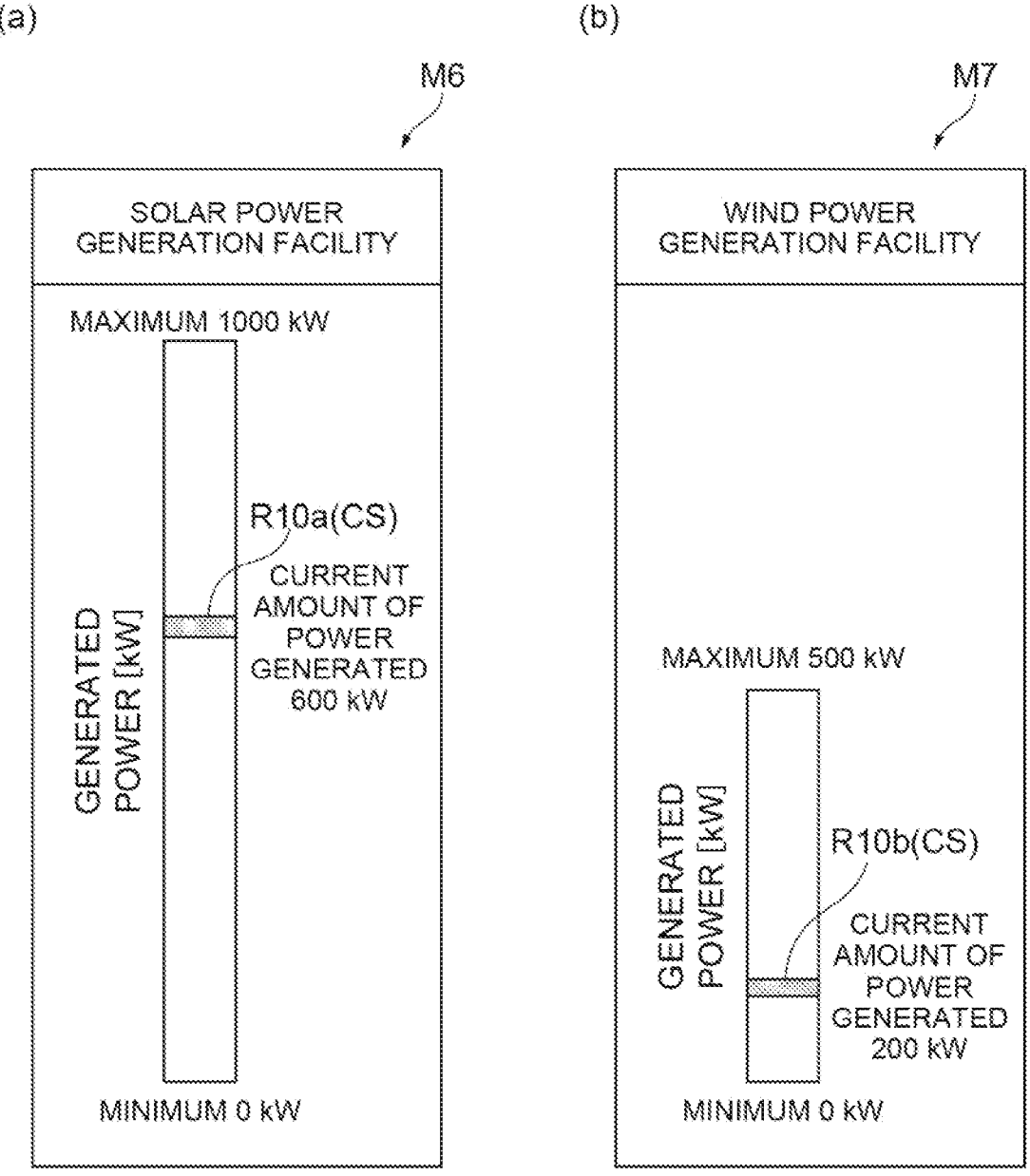
FIG. 10(*a*) illustrates an example of an operation map corresponding tea an enemy supply facility which is a solar power generation facility.

Instead of the cogeneration system or the storage battery, a renewable energy generation device may be adopted as the energy supply facility. For example, a solar power generation facility and a wind power generation facility can be adopted as the energy supply facilities. FIG. 10($a$) illustrates an example of an operation map M6 output by the operable rank display unit 56 in a case in which the solar power generation facility is adopted as the energy supply facility. FIG. 10($b$) illustrates an example of an operation map M7 output by the operable range display unit 56 in a case in which the wind power generation facility is adopted as the energy supply facility. The operation maps M6 and M7 are bar graphs. The lower ends of the operation maps M6 and M7 indicate the minimum generated power. The upper ends of the operation maps M6 and M7 indicate the maximum generated power. Bars R10$a$ and R10$b$ indicating the current operating state CS are shown between the upper ends and the lower ends of the bar graphs.

Figure 11:
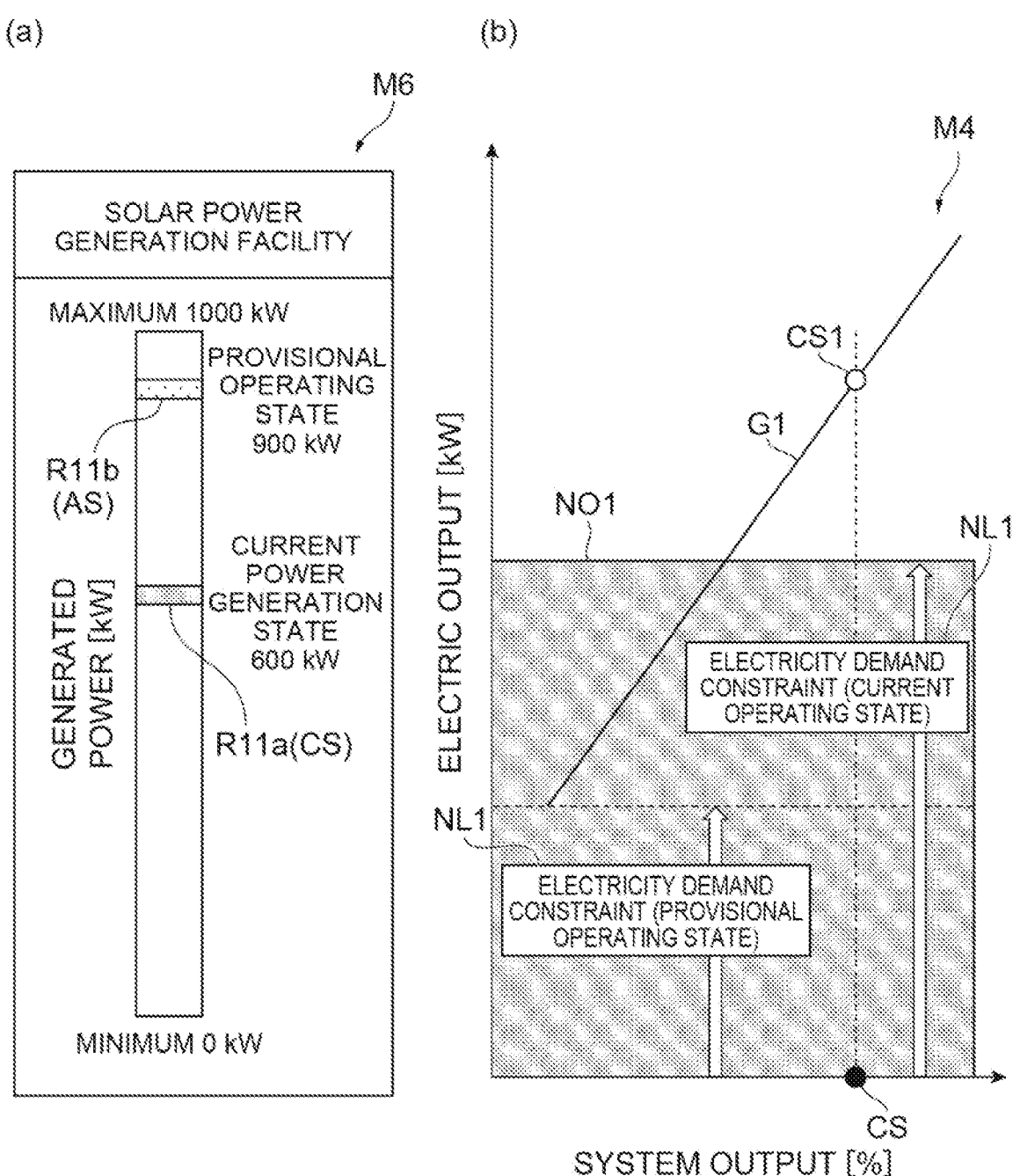
FIG. 11(*a*) illustrates an example of an operation map corresponding to an energy supply facility which is a solar power generation facility.

When there is a system including a solar power generation facility and a cogeneration system of a fixed heat-to-power ratio type, an operator of this system may check the influence of the operating state of the solar power generation facility on the operation constraint conditions of the cogeneration system of a fixed heat-to-power ratio type. In this case, as illustrated in FIGS. 11($a$) and 11($b$), the operation map M6 corresponding to the solar power generation facility and the operation map M4 corresponding to the cogeneration system of a fixed heat-to-power ratio type are operatively associated with each other. The operator inputs the provisional operating state AS (bar R11$b$) for the current operating state CS (bar R11$a$) of the solar power generation device. The designation of the provisional operating state AS may be automatically input, instead of being input by the operator. For example, the amount of power generated by a solar power generation device after a predetermined time is predicted using weather forecast data and the like. Then, a measured value of the predicted amount of power generated may be automatically input as the provisional operating state. The electricity demand constraint (first inoperable region NO1) of the cogeneration system of a fixed heat-to-power ratio type may change depending on the provisional operating state AS of the solar power generation device.

Figure 12:
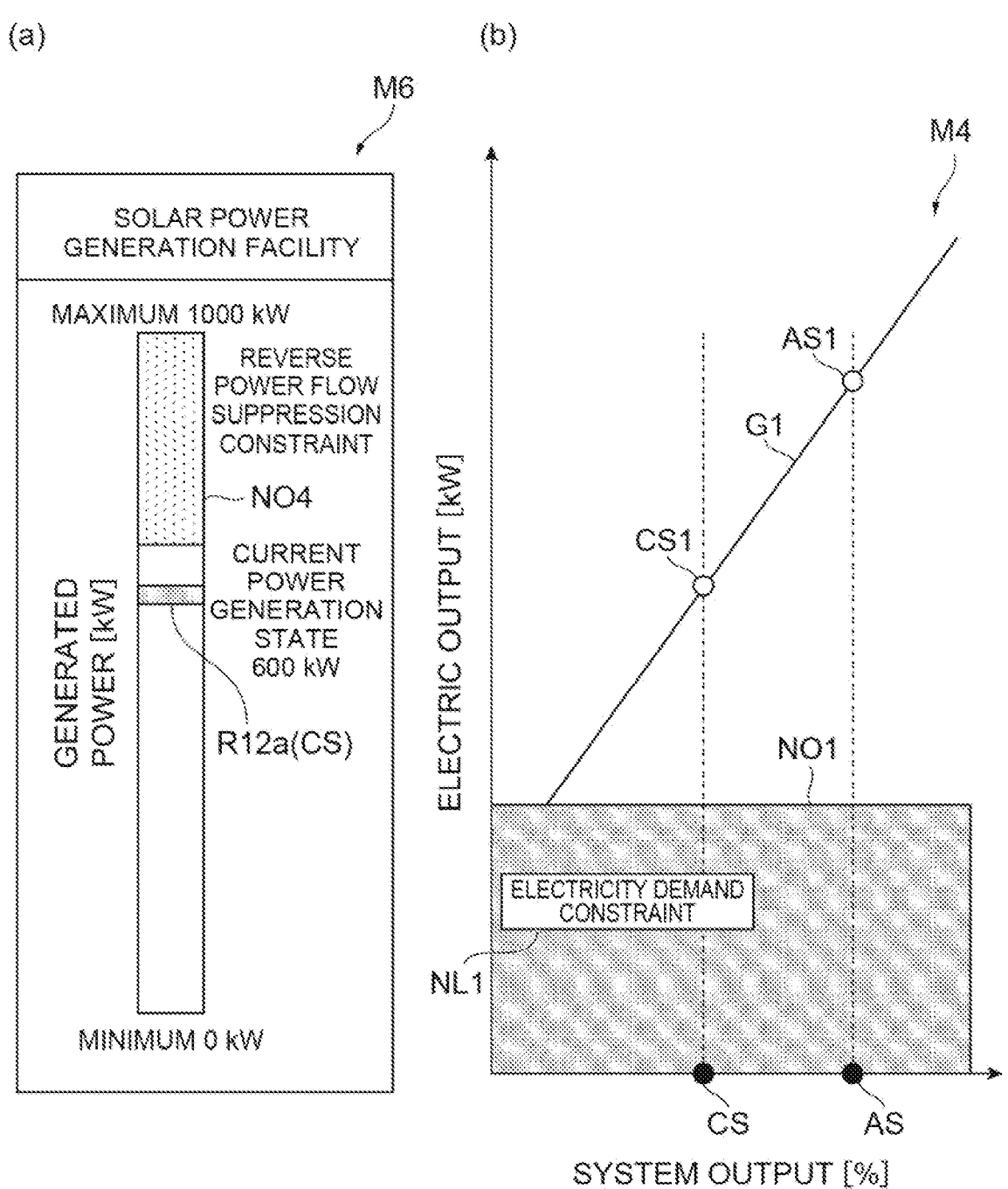
FIG. 12(*a*) illustrates an example of an operation map corresponding to an energy supply facility which is a solar power generation facility.

An aspect opposite to the above is also possible. The operator may check the influence of the operating state of the cogeneration system of a fixed heat-to-power ratio type on the operation constraint conditions of the solar power generation facility. An example of the operation constraint conditions of the solar power generation facility is output limitation for preventing reverse power flow. Even in this case, as illustrated in FIGS. 12($a$) and 12($b$), the operation map M6 corresponding to the solar power generation facility and the operation map M4 corresponding to the cogeneration system of a fixed heat-to-power ratio type are operatively associated with each other. The operator designates the provisional operating state AS (electric output AS1) for the current operating state CS (electric output CS1) of the cogeneration system of a fixed heat-to-power ratio type. Then, the constraint conditions (fourth inoperable region NO4) for suppressing the reverse power flow of the solar power generation facility change depending on the provisional operating state AS of the cogeneration system of a fixed heat-to-power ratio type. This display aspect enables the operator to know that there is a possibility that the solar power generation device will perform output suppression for the purpose of reverse power flow. In addition, the operator can intuitively understand a margin for the occurrence of output suppression.

REFERENCE SIGNS LIST

1: energy system, 2A, 2B, 2C: operator, 10: microgrid, 11, 11A, 11B: energy demand facility, 12, 12A, 12B, 12C: enemy supply facility, 50: operation assistance device, 51: input terminal, 52: operating state provisional designation unit, 53: device characteristic database, 54: cost information database, 55: operable range calculation unit, 56: operable range display unit, 80: external energy system, CS: current operating state, FS1, FS2: future operating state, AS: provisional operating state, NO1: first inoperable region, NO2: second inoperable region, NO3: third inoperable region, NL1: first constraint label, NL2: second constraint label, third constraint label, M1, M2, M3, M4, M5, M6: operation map.

The invention claimed is:

1. An operation assistance device that assists an operation of an energy supply facility outputting a first energy and a second energy to an energy demand facility, the operation assistance device comprising:
    a calculation unit that calculates constraint conditions imposed on the energy supply facility on the basis of matters caused by the energy demand facility and matters caused by the energy supply facility; and
    a display unit that displays an operating state of the energy supply facility, wherein
    the constraint conditions include a first constraint condition based on energy demand and a second constraint condition based on device capabilities, and
    the display unit:
        displays a range in which the energy supply facility is inoperable by superimposing a range in which the energy supply facility is inoperable determined based on the second constraint condition onto a range in which the energy supply facility is inoperable determined based on the first constraint condition wherein the first and second constraint conditions are different; and
        displays a non-overlapping region that does not overlap any range in which the energy supply facility is inoperable wherein the non-overlapping region indicates a range in which the energy supply facility is operable.

2. The operation assistance device according to claim 1, wherein the display unit displays the operating state and a range in which the energy supply facility is inoperable in a two-dimensional display region having at least one of the first energy and the second energy as a variable.

3. The operation assistance device according to claim 1, wherein the calculation unit further calculates a change in the operating state over time.

4. The operation assistance device according to claim 1, wherein the operating state includes a current operating state of the energy supply facility.

5. The operation assistance device according to claim 1, wherein the operating state includes an assumed operating state of the energy supply facility different from a current operating state.

6. A non-transitory storage medium storing an operation assistance program that assists an operation of an energy supply facility outputting a first energy and a second energy to an energy demand facility, the operation assistance program comprising:
    a calculation unit that calculates constraint conditions imposed on the energy supply facility on the basis of matters caused by the energy demand facility and matters caused by the energy supply facility; and
    a display unit that displays an operating state of the energy supply facility, wherein
    the constraint conditions include a first constraint condition based on energy demand and a second constraint condition based on device capabilities, and
    the display unit:
        displays a range in which the energy supply facility is inoperable by superimposing a range in which the energy supply facility is inoperable determined based on the second constraint condition onto a range in which the energy supply facility is inoperable determined based on the first constraint condition wherein the first and second constraint conditions are different; and
        displays a non-overlapping region that does not overlap any range in which the energy supply facility is inoperable wherein the non-overlapping region indicates a range in which the energy supply facility is operable.

7. An operation assistance device that assists an operation of a first energy supply facility outputting energy to a first energy demand facility and a second energy supply facility outputting energy to a second energy demand facility, the operation assistance device comprising:
    a calculation unit that calculates first constraint conditions imposed on the first energy supply facility on the basis of matters caused by the first energy demand facility and matters caused by the first energy supply facility and second constraint conditions imposed on the second energy supply facility on the basis of matters caused by the second energy demand facility and matters caused by the second energy supply facility; and
    a display unit that displays a first operating state of the first energy supply facility and a second operating state of the second energy supply facility,
    wherein
        the first constraint conditions and the second constraint conditions each include constraints based on energy demand and constraints based on device capabilities,
        the display unit sets a first display region and a second display region different from the first display region,
        the display unit further displays, in the first display region, a range in which the first energy supply facility is inoperable and a range in which the first energy supply facility is operable determined based on the first constraint conditions in addition to the first operating state wherein the first constraint conditions are represented by superimposed regions in the first display region, and
        the display unit further displays, in the second display region, a range in which the second energy supply facility is inoperable and a range in which the second energy supply facility is operable determined based on the second constraint conditions in addition to the second operating state wherein the second constraint conditions are represented by superimposed regions in the second display region.

8. The operation assistance device according to claim 7, wherein the calculation unit further calculates an assumed constraint condition imposed on the second energy supply facility on the basis of an assumed operating state of the first energy supply facility different from a current operating state and matters caused by the second energy demand facility, the display unit displays, in the first display region, the first constraint conditions, the range in which the first energy supply facility is inoperable, the range in which the first energy supply facility is operable, the first operating state of the first energy supply facility, and the assumed operating state, and the display unit displays, in the second display region, the second constraint conditions, the range in which the second energy supply facility is inoperable, the range in which the second energy supply facility is operable, and the assumed constraint condition.

\* \* \* \* \*